United States Patent
Lee et al.

(10) Patent No.: US 8,239,545 B2
(45) Date of Patent: Aug. 7, 2012

(54) METHOD FOR ASYNCHRONOUS MULTIMEDIA RETRIEVAL

(75) Inventors: Jong Sul Lee, Yongin-si (KR); Seok Pil Lee, Seongnam-si (KR); Tae Bum Lim, Yongin-si (KR); Kyoung Ro Yoon, Seoul (KR)

(73) Assignee: Korea Electronics Technology Institute, Seongnam-Si (KR)

( * ) Notice: Subject to any disclaimer, the term of this patent is extended or adjusted under 35 U.S.C. 154(b) by 704 days.

(21) Appl. No.: 12/095,204

(22) PCT Filed: Apr. 10, 2008

(86) PCT No.: PCT/KR2008/002027
§ 371 (c)(1),
(2), (4) Date: May 28, 2008

(87) PCT Pub. No.: WO2008/123754
PCT Pub. Date: Oct. 16, 2008

(65) Prior Publication Data
US 2011/0055401 A1    Mar. 3, 2011

(30) Foreign Application Priority Data
Apr. 10, 2007  (KR) .................. 10-2007-0035100

(51) Int. Cl.
*G06F 15/16*  (2006.01)
(52) U.S. Cl. ........................ 709/227; 709/225
(58) Field of Classification Search ............. 709/203, 709/217–219, 223, 225, 227
See application file for complete search history.

(56) References Cited

U.S. PATENT DOCUMENTS

| | | | |
|---|---|---|---|
| 6,424,704 B1* | 7/2002 | Lee | 379/112.01 |
| 7,296,074 B2* | 11/2007 | Jagels | 709/227 |
| 7,978,598 B1* | 7/2011 | Majee | 370/225 |
| 2003/0128819 A1* | 7/2003 | Lee et al. | 379/88.13 |
| 2005/0027869 A1 | 2/2005 | Johnson | |
| 2005/0265345 A1* | 12/2005 | Chen et al. | 370/392 |
| 2006/0040682 A1* | 2/2006 | Goertz et al. | 455/466 |
| 2007/0050510 A1* | 3/2007 | Jiang | 709/227 |
| 2010/0064025 A1* | 3/2010 | Nelimarkka et al. | 709/217 |

FOREIGN PATENT DOCUMENTS
KR  1020060060654 A  6/2006

OTHER PUBLICATIONS
Chinese Office Action dated Jun. 4, 2010 for counterpart Chinese Application No. 200880000414.7.

* cited by examiner

*Primary Examiner* — Faruk Hamza
(74) *Attorney, Agent, or Firm* — Sughrue Mion, PLLC

(57) ABSTRACT

The present invention relates to a method for asynchronous multimedia content retrieval, which can be applied to TV-Anytime standard or MPEG standard. In summary, an asynchronous multimedia retrieval method is provided as including: a client establishing the first session as requesting to the server; transmitting to the server the retrieval inquiry message for contents that the server needs; terminating the first session after the retrieval inquiry; establishing the second session and requesting to the server the result for the retrieval inquiry at a certain point in time that the previously set time has passed; and receiving the retrieval result from the server and terminating the second session.

18 Claims, 2 Drawing Sheets

METHOD FOR ASYNCHRONOUS MULTIMEDIA RETRIEVAL

BACKGROUND OF THE INVENTION

The present invention generally relates to a retrieval service, and more particularly, to a method for searching multimedia data asynchronously and extracting the same.

According to generalization of a digital broadcasting service, research for a technology providing the customized broadcasting service under multi-channel and multi-media environment is actively progressed.

For example, TV-Anytime is an international standard, which allows a user to watch preferred contents by matching metadata with user's preference, based on metadata expressing description information of contents.

In TV-Anytime, the metadata include content-based description defined in MPEG-7 and information of the electronic program guide (EPG), and can make a user easily search and select contents preferred.

Standard of metadata is consisted of two parts. Part A defines schema which is a format to describe metadata, using the description definition language (DDL)(ISO/IEC 15938-2) based on MPEG-7. Part B which relates to metadata transmission includes a binary format for MPEG-7(MPEG-7 BiM)(ISO/IEC 15938-1), a fragmentation model, and a technique for encapsulation and indexing.

TV-Anytime Metadata are comprised of program description metadata and user description metadata.

The program description metadata is comprised of contents description metadata and instance description metadata. The program description metadata is associated with program using a content identifier called as the content reference identifier (CRID).

The content description metadata is generated by a content creator, and include a program title, genre, an abstract and a critic review. The instance description metadata are generated by a content provider and include location (such as broadcasting time, channel, URL, and so forth), usage rule and delivery parameter. Lastly, the user description metadata are generated by a user and include user preference, usage history and personal bookmark.

The TV-Anytime standard defines two types of metadata web services, which are well-defined behavior and remote procedure for input/output set, in order for two-way metadata web service through return pass.

In the web service description language (WSDL) standard based on the extensible markup language (XML), the remote procedure as described above is defined as the type of simple object access protocol (SOAP) operation. The remote procedure has the "get_Data( )" operation for metadata retrieval and the "submit_Data" operation for user description submission. For reference, the SOAP protocol is the XML communication protocol which can approach to an object in a distributed environment.

A request/response type used at the TV-Anytime metadata service is defined in name space of "urn:tva:transport:2002", and the name space is provided as a verification tool for a variety of massages. Types defined in metadata specification and content referencing standard are referred in transport name space. Schema fragment is defined in the name space, and a name space provider is defined as "tns:" in the schema fragment. A perfect XML schema file is "tva_transport_types_v10.xsd".

On the other hand, "get_Data( )" operation for data retrieval provide a client with the function for searching TV-Anytime data from a server for either a program or a program group. Examples for the function which the TV-Anytime metadata provider can provide by using the "get_Data( )" operation are as follows:

returning content referencing data for CRID using a CRID list;

returning TV-Anytime metadata for CRID by using a CRID list;

receiving an inquiry for particular metadata attribute, such as genre, actor and so forth, and returning a program related to the inquiry; and responding to an inquiry for particular time or particular channel, and returning a corresponding program.

More concretely explaining details with regard to behavior of "get_Data( )" operation, the client in TV-Anytime service transmits through network the SOAP request message (get_Data( )Request) to the metadata service server. At this time, "get_Data( )" operation fundamentally supports all kinds of inquiry types and provides broad range of inquiries for the metadata limitation condition. As followed by the transmission, the metadata service server returns result value for the SOAP request message by the SOAP response message ("get_Data( )" Response).

In summary, the TV-Anytime metadata client can perform metadata retrieval and server delivery of user's data through the "get_Data( )" and the "submit_Data( )" which are SOAP operations regulated in TV-Anytime.

FIG. 1 is a schematic view illustrating a multimedia retrieval procedure in TV-Anytime standard in accordance with the conventional technology.

As illustrated in FIG. 1, the multimedia retrieval method in accordance with the existing technology, a user send the retrieval inquiry to a server and then wait the corresponding result from the server. At this time, the user performs retrieval procedure through the "get_Data( )" operation, and the "get_Data( )" operation is defined as the SOAP message.

In addition, the multimedia retrieval procedure in accordance with the conventional technology is basically operated in the retrieval environment wherein status information requesting a retrieval inquiry is a text, and when status information of retrieval inquiry is a text, a problem for the multimedia retrieval method shall not occur.

However, when the retrieval inquiry status information includes contents like image or moving picture, processing time and resources needed for the contents increase much. Thus, if a session between a client and a server is maintained until retrieval result is received from the retrieval inquiry, much more resources of the client and the server are consumed and user's waiting time also much more increases in comparison with the waiting time for which status of retrieval inquiry is a text.

Furthermore, when the network session has been cut off during processing retrieval, there is a disadvantage to rerun the retrieval from an initial inquiry request that the inquiry has been begun.

SUMMARY OF THE INVENTION

The present invention is to solve the above-described disadvantages, and the object of the present invention is to provide a multimedia retrieval method which can protect a session and support the asynchronous retrieval environment to receive retrieval result without unexpected waiting time even when searching multimedia contents.

This object is achieved by a method which a client performs in order to search asynchronous multimedia contents applied to client-server computing model. The method of the present invention, which is the asynchronous multimedia retrieval method supporting the asynchronous retrieval environment, including: establishing the first session by requesting to the server; transmitting to the server a retrieval inquiry message for contents needed by the client; terminating the first session after the retrieval inquiry; establishing the second session and requesting a result of the retrieval inquiry to the server at any point in time that predetermined waiting time has passed; and receiving the retrieval result from the server and terminating the second session.

According to another aspect of the present invention, a method which a server performs in order to search asynchronous multimedia contents applied to client-server computing model, is provided. The method includes: establishing the first session in response to receiving request for connecting a retrieval inquiry session from the client; receiving a retrieval inquiry message from the client; receiving session disconnect request from the client and terminating the first session; performing retrieval process according to the retrieval inquiry message; saving the retrieval result; establishing the second session in response to request from the client and receiving the retrieval result request; transmitting the retrieval result by responding the request; and terminating the second session.

In summary, the client requests retrieval to the server and cuts off connection with the server after receiving the acknowledge signal for the retrieval request from the server. The received inquiry is performed on a retrieval server and the result for the received inquiry is saved and managed. The client is reconnected after the time which predetermined setting time is passed and requests the retrieval result of the client.

The present invention supports the asynchronous retrieval environment can be used to a multimedia service, such as TV-Anytime or MPEG-7. According to the present invention, the server and the client can cut off the connection while performing retrieval after a user has requested a inquiry to the server in case of searching multimedia contents, it is possible to protect a session even though the connected session has been cut off as well as for a user to receive the retrieval result after waiting only during predetermined time without unpredictable continuous waiting. Furthermore, since the server can predict retrieval load, effective load control can be performed and appropriate load balance can be achieved.

DETAILED DESCRIPTION OF PREFERRED EMBODIMENTS

In summary of technical characteristics of the present invention, a client requests retrieval to a server and the client cuts off connection with the server after receiving the acknowledge from the server. After that, the received inquiry is performed in the retrieval server, and the result of the inquiry is saved and managed.

Hereinafter, the constitution of the present invention is described in details as referring to the attached drawings.

Figure 1:
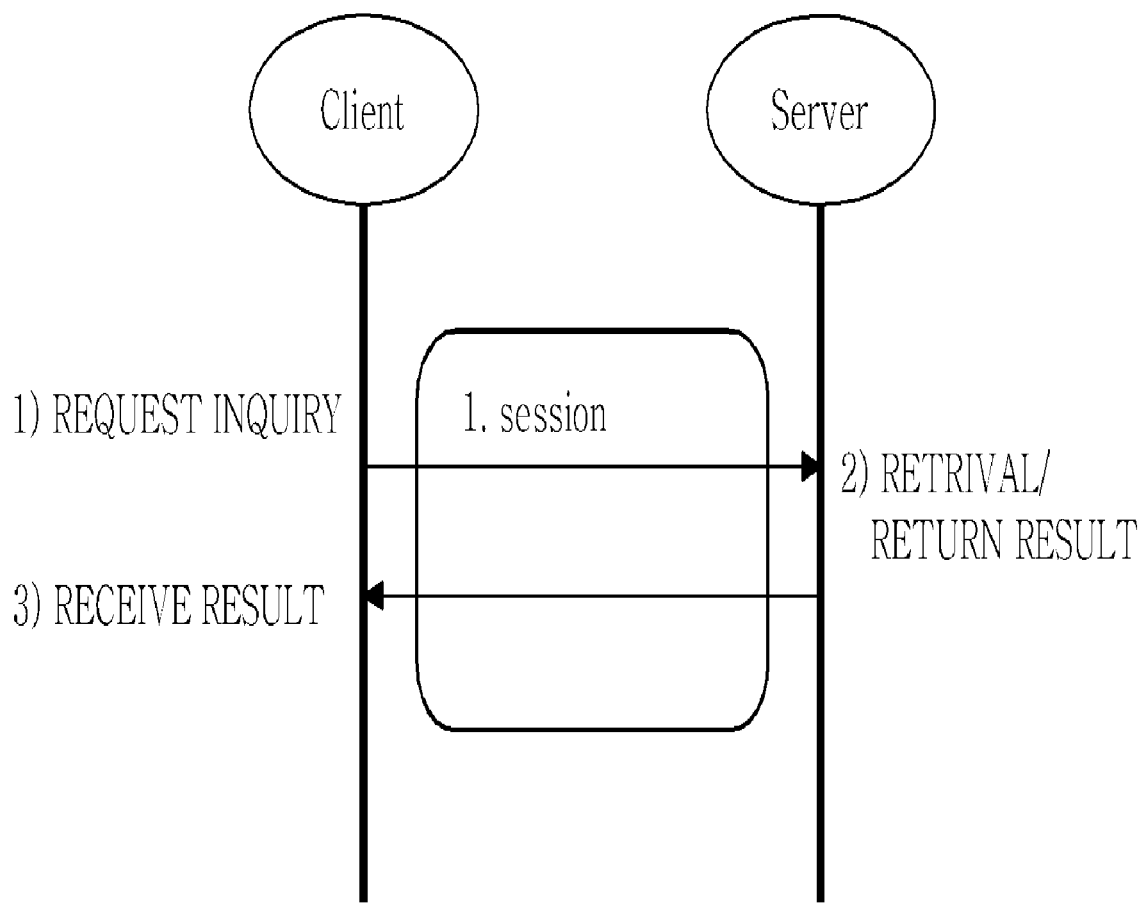
FIG. 1 is a procedural view which illustrates multimedia retrieval procedure according to the conventional technology.
Figure 2:
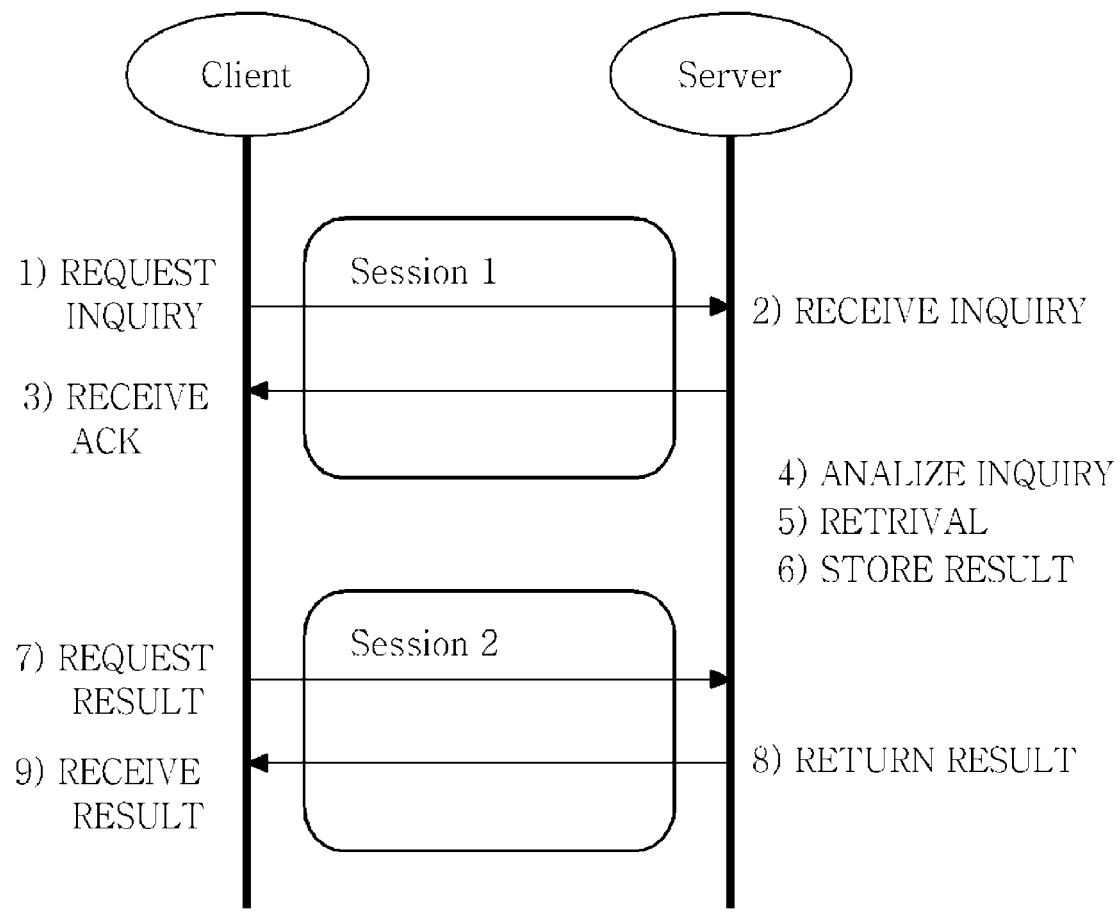
FIG. 2 is a procedural view which illustrates asynchronous multimedia retrieval procedure according to the present invention.

FIG. 2 is a procedural view which illustrates the asynchronous multimedia retrieval procedure according to the present invention.

As illustrated, a multimedia retrieval method is largely comprised of: 1) inquiry request and result store; and 2) result request.

1) Requesting Inquiry and Storing Result

A client requests a server to establish a retrieval inquiry session and asks for retrieval by transmitting a retrieval inquiry message if a session has been established.

The server receives the inquiry message requested by the client and transmits to the corresponding client the receipt confirmation message or acknowledge message.

The client or server cuts off the connection with the other after checking the transmitted message. At the same time or thereafter, the server analyzes contents of the corresponding inquiry and performs retrieval. Furthermore, the server can save and manage the searched inquiry result.

2) Requesting and Returning Result

The client can request the inquiry result after a certain period of time has passed. The server either returns the inquiry result to the client or transmits the retrieval status.

That is to say, by separating a retrieval inquiry session with a retrieval result request session and by disconnecting connection between the client and the server in the process of retrieval, the client can prevent consumption of unnecessary resources and further overcome the conventional problem which is to request the inquiry again from the beginning when the session between the client and the server has been closed in the process of retrieval.

In a preferred embodiment of the present invention, the retrieval inquiry message includes retrieval beginning time and retrieval duration information. The server may perform according to the retrieval beginning time and retrieval duration. Specifically, the server begins retrieval at the retrieval beginning time and search or retrieve during the retrieval duration.

Since the retrieval beginning time and the retrieval duration are generated in the client and delivered to the server from the client, the client can have the definite information about whether the client requests inquiry result at a certain point in time after the client has inquired.

In other words, if the retrieval beginning time and the retrieval duration are 9:00 and 37 minutes respectively, the client can predict that the retrieval work of the server has been completed at the expected time of 9:37.

Therefore, the client can obtain multimedia contents or information related to the multimedia content at the time it wants, by requesting the retrieval result to the server at any point in time after the completion expected time.

Meanwhile, it is preferable that the client generates a retrieval identifier and includes the retrieval identifier in the retrieval inquiry message and result request message.

If the client includes the retrieval identifier which is the same retrieval identifier included in one of the retrieval inquiry messages previously transmitted, in the result request message, the server can select the identified inquiry result among a plurality of the inquiry results which previously request, and transmit it by using the identifier.

In another embodiment of the present invention, the server can appropriate load manage using the retrieval beginning time and the retrieval duration.

That is to say, since the server can grasp the time(s) to perform the retrieval work before retrieval, the server load can be managed.

For example, when the retrieval beginning times and the retrieval durations included in a plurality of retrieval inquiry messages are received from a single client or a plurality of clients, the server can calculate and anticipate the retrieval load in present and future time.

If overload is expected because of retrieval works have been intensively reserved on particular time(s), the server may perform a part of reserved works before the corresponding retrieval beginning time.

In this way, the server can disperse the reserved loads and avoid overload.

Meanwhile, even though overload is anticipated, it will be undesirable that the server performs retrieval after the retrieval beginning time requested by the client, therefore, it is preferable that processing capacity of the server is to be set up as considering an inquiry pattern (for example, time difference between the inquiry request and the retrieval beginning, retrieval duration) of retrieval request of the client.

As described above, the retrieval inquiry message which the client transmits includes the retrieval identifier. After the server stores the retrieval result with the retrieval identifier, and when there is a retrieval result request from the client, the server extracts the retrieval result performed by the former retrieval inquiry on the basis of the same identifier included in this request and transmits the retrieval result to the client.

In order to perform the procedure as described above, the multimedia retrieval method according to preferred embodiment of the present invention defines a data type for synchronous/asynchronous retrieval as the following table 1:

TABLE 1

| | |
|---|---|
| SyncAgentConstraintsType | Synchronous type acquiring retrieval result without session closing |
| TimeOut | Retrieval work time value performing retrieval in server in case of synchronous retrieval |
| AsyncAgentConstraintsType | Asynchronous type which does acquire retrieval result with session closing |
| StartTime | Value which sets up the time that retrieval begins in server |
| SearchDuration | Retrieval work time value performing retrieval in server in case of asynchronous retrieval |
| RetrievalID | Retrieval ID is an identifier which identifies an inquiry between a server and a client when asynchronous retrieval is performed Retrieval ID is generated in server or client, and is the unique identifier. |

By including 'SyncAgentConstraintsType' and 'AsyncAgentConstraintsType' in retrieval inquiry message, the retrieval inquiry message can specify whether the retrieval inquiry is for a synchronous type or an asynchronous type.

As the 'SyncAgentConstraintsType' is an inquiry type for synchronous retrieval, the inquiry result can be provided similar to conventional way. At this time, the client can set up the retrieval work time for synchronous retrieval using 'TimeOut'.

The server performs retrieval just as much as 'TimeOut' time and responds to a user.

As the 'AsyncAgentConstraintsType' is an inquiry type for asynchronous retrieval, the client closing first session after requesting an inquiry, and the server performs retrieval at 'StartTime' set up by the client and stores the retrieval result after searching just as much as 'SearchDuration'. The client establishes second session and requests the result after a point in time that a period of 'StartTime' plus 'SearchDration' has passed.

The followings are exemplary embodiments of the multimedia retrieval method which applies the defined synchronous and asynchronous retrieval method.

```
<complexType name="SyncAgentConstraintsType">
    <sequence>
        <element name="TimeOut" type="mpeg7:TimeType" minOccurs="0"/>
    </sequence>
</complexType>
<complexType name="AsyncAgentConstraintsType">
    <sequence>
        <element name="StartTime" type="mpeg7:TimeType" minOccurs="0"/>
        <element name="SearchDuration" type="mpeg7:durationType" minOccurs="0" />
    </sequence>
</complexTyp
<complexType name="search_MPEGType">
    <sequence>
        <choice minOccurs="0">
            <element name="AsyncAgentConstraint" type="MP7QF:AsyncAgentConstraintsType" maxOccurs="unbounded"/>
            <element name="SyncAgentConstraint" type="MP7QF:SyncAgentConstraintsType" maxOccurs="unbounded"/>
        </choice>
        <element name="QueryConstraints"/>
        <element name="PersonalInformation" type="tva2:ExtendedUserDescriptionType" minOccurs="0"/>
        <element name="RequestedContents" type="MP7QF:RequestedContentsType" minOccurs="0"/>
    </sequence>
    <attribute name="maxContents" type="unsignedInt"/>
    <attribute name="personalInfoUse" type="boolean" default="true"/>
    <attribute name="RetrievalID" type="string"/>
</complexType>
<element name="search_MPEG" type="MP7QF:search_MPEGType"
```

Industrial Applicability

The multimedia retrieval method according to present invention supporting asynchronous retrieval environment can be to be used to a multimedia service, such as TV-Anytime or MPEG-7, etc.

The advantage of the present invention is that, by cutting off the connection in the process that the server is performing retrieval after a user requests an inquiry to the server, the method can protect a session even when the connection session has been cut off during retrieval process performed in server. Another advantage of the present invention is that the user can receive the retrieval result after waiting during the only expected period of time without constant waiting time. Furthermore, since the server can previously predict retrieval load, the server load can be managed and the appropriate load balance thereof can be achieved.

What is claimed is:

1. A method of retrieving multimedia content from a server, the method comprising:
    establishing a first session which connects a client, comprising a processor, with the server, the first session comprising transmitting, from the client to the server, a retrieval inquiry which requests retrieval of the multimedia content, under control of the processor;
    terminating the first session after the transmitting the retrieval inquiry, to disconnect the client from the server;
    establishing a second session which reconnects the client with the server, the second session comprising:
        transmitting, at a predetermined time, from the client to the server, a result request, which requests the server to return a result of the retrieval to the client, under control of the processor;
        receiving, at the client, the result of the retrieval transmitted from the server in response to the result request; and
    terminating the second session after the receiving the result of the retrieval, to disconnect the client from the server,
    wherein the retrieval inquiry comprises a time to begin the retrieval of the multimedia content and information on a duration of the retrieval of the multimedia content, and
    wherein the predetermined time is set based on the time to begin the retrieval of the multimedia content and the information on the duration of the retrieval of the multimedia content.

2. The method of claim 1, wherein the transmitting the retrieval inquiry comprises generating an identifier of the retrieval and inserting the identifier of the retrieval in the retrieval inquiry, and
    wherein the transmitting the result request from the client to the server comprises inserting the identifier of the retrieval, which is the same as the identifier of the retrieval included in the retrieval inquiry, in the result request.

3. The method of claim 2, wherein the retrieval inquiry comprises a time to begin the retrieval of the multimedia content and information on a duration of the retrieval of the multimedia content.

4. The method of claim 3, wherein the predetermined time is set based on the time to begin the retrieval of the multimedia content and the information on the duration of the retrieval of the multimedia content.

5. The method of claim 1, wherein the transmitting the retrieval inquiry comprises generating an identifier of the retrieval and inserting the identifier of the retrieval in the retrieval inquiry, and
    wherein the transmitting the result request from the client to the server comprises inserting the identifier of the retrieval, which is the same as the identifier of the retrieval included in the retrieval inquiry, in the result request.

6. The method of claim 5, wherein the predetermined time is later than an end of the duration of the retrieval.

7. The method of claim 1, wherein the predetermined time is later than an end of the duration of the retrieval.

8. A method of retrieving and transmitting multimedia contents to a client, the method comprising:
    establishing a first session which connects a server, comprising a processor, with the client, the first session comprising receiving, at the server, a retrieval inquiry which requests retrieval of the multimedia content, from the client;
    terminating the first session after receiving the retrieval inquiry, to disconnect the server from the client;
    performing the retrieval of the multimedia content in response to the retrieval inquiry, under control of the processor;
    storing a result of the retrieval;
    establishing a second session which reconnects the server with the client, the second session comprising:
        receiving, at the server, a result request, which requests the server to return a result of the retrieval to the client, transmitted from the client;
        transmitting, from the server to the client, the result of the retrieval in response to the result request; and
    terminating the second session after the transmitting the result of the retrieval, to disconnect the server from the client,
    wherein the retrieval inquiry comprises a time to begin the retrieval of the multimedia content and information on a duration of the retrieval of the multimedia content, and
    wherein the performing the retrieval starts at the time to begin the retrieval and continues during the duration of the retrieval.

9. The method of claim 8, wherein the retrieval inquiry comprises an identifier of the retrieval and the result of the retrieval is stored with the identifier of the retrieval.

10. The method of claim 9, wherein the result request comprises the identifier of the retrieval which is the same as the identifier of the retrieval included in the retrieval inquiry, and
    wherein the transmitting the result of the retrieval comprises selecting the result of the retrieval based on the identifier of the retrieval, from among a plurality of results of retrieval generated in response to a plurality of retrieval inquiries.

11. The method of claim 10, wherein the retrieval inquiry comprises a time to begin the retrieval of the multimedia content and information on a duration of the retrieval of the multimedia content, and
    wherein the performing the retrieval starts at the time to begin the retrieval and continues during the duration of the retrieval.

12. The method of claim 9, wherein the retrieval inquiry comprises a time to begin the retrieval of the multimedia content and information on a duration of the retrieval of the multimedia content, and
    wherein the performing the retrieval starts at the time to begin the retrieval and continues during the duration of the retrieval.

13. The method of claim 12, wherein the result request comprises the identifier of the retrieval which is the same as the identifier of the retrieval included in the retrieval inquiry, and wherein the transmitting the result of the retrieval comprises selecting the result of the retrieval based on the identifier of the retrieval, from among a plurality of results of retrieval generated in response to a plurality of retrieval inquiries.

14. The method of claim 8, wherein the retrieval inquiry comprises an identifier of the retrieval and the result of the retrieval is stored with the identifier of the retrieval.

15. The method of claim 14, wherein the result request comprises the identifier of the retrieval which is the same as the identifier of the retrieval included in the retrieval inquiry, and
wherein the transmitting the result of the retrieval comprises selecting the result of the retrieval based on the identifier of the retrieval, from among a plurality of results of retrieval generated in response to a plurality of retrieval inquiries.

16. The method of claim 8, wherein the result request is received at the server at a predetermined time, and
wherein the predetermined time is set based on the time to begin the retrieval of the multimedia content and the information on the duration of the retrieval of the multimedia content.

17. The method of claim 8, further comprising analyzing a load of the server at a given time, wherein the performing the retrieval starts before the time to begin the retrieval if the load of the server at the given time is beyond a threshold according to the analyzing.

18. The method of claim 8, wherein the given time is a future time.

* * * * *